US010317238B2

(12) United States Patent
Jiang et al.

(10) Patent No.: US 10,317,238 B2
(45) Date of Patent: Jun. 11, 2019

(54) NAVIGATION SYSTEM WITH RANKING MECHANISM AND METHOD OF OPERATION THEREOF

(71) Applicant: Telenav, Inc., Sunnyvale, CA (US)

(72) Inventors: Changzheng Jiang, Santa Clara, CA (US); Kumar Maddali, San Ramon, CA (US); Maneesha Jain, Los Gatos, CA (US)

(73) Assignee: Telenav, Inc., Santa Clara, CA (US)

( * ) Notice: Subject to any disclaimer, the term of this patent is extended or adjusted under 35 U.S.C. 154(b) by 23 days.

(21) Appl. No.: 14/151,454

(22) Filed: Jan. 9, 2014

(65) Prior Publication Data
US 2015/0192419 A1 Jul. 9, 2015

(51) Int. Cl.
*G01C 21/36* (2006.01)
(52) U.S. Cl.
CPC ................................ *G01C 21/3682* (2013.01)
(58) Field of Classification Search
CPC ............... G01C 21/36; G01C 21/3614; G01C 21/3679; G01C 21/3682; G06F 17/30241; G06F 17/3053; G06F 17/3087; G06T 15/20; G06T 17/05; G06T 19/00
See application file for complete search history.

(56) References Cited

U.S. PATENT DOCUMENTS

| 7,926,965 | B2 | 4/2011 | Cho et al. | |
|---|---|---|---|---|
| 8,364,398 | B2 * | 1/2013 | Rossio et al. | 701/439 |
| 8,612,478 | B1 * | 12/2013 | Duong et al. | 707/770 |
| 2006/0271531 | A1 * | 11/2006 | O'Clair et al. | 707/5 |
| 2007/0112738 | A1 * | 5/2007 | Livaditis | 707/3 |
| 2007/0219706 | A1 | 9/2007 | Sheynblat | |
| 2008/0154878 | A1 * | 6/2008 | Rose et al. | 707/5 |
| 2009/0005987 | A1 * | 1/2009 | Vengroff et al. | 701/300 |
| 2009/0012953 | A1 * | 1/2009 | Chu et al. | 707/5 |
| 2009/0138445 | A1 * | 5/2009 | White et al. | 707/3 |
| 2011/0145228 | A1 * | 6/2011 | Laurenzo et al. | 707/723 |
| 2012/0041673 | A1 * | 2/2012 | Vandivier et al. | 701/426 |
| 2012/0166431 | A1 * | 6/2012 | Brewington et al. | 707/724 |
| 2012/0173500 | A1 * | 7/2012 | Chakrabarti et al. | 707/706 |
| 2012/0197524 | A1 * | 8/2012 | Beyeler et al. | 701/426 |
| 2012/0304087 | A1 * | 11/2012 | Walkin et al. | 715/764 |
| 2014/0012909 | A1 * | 1/2014 | Sankar | G06Q 10/10 709/204 |
| 2014/0278063 | A1 * | 9/2014 | Beyeler et al. | 701/426 |
| 2015/0039227 | A1 * | 2/2015 | Kim | G01C 21/3682 701/532 |

* cited by examiner

*Primary Examiner* — Thomas Ingram
(74) *Attorney, Agent, or Firm* — Perspectives Law Group, Corp.

(57) ABSTRACT

A method of operation of a navigation system includes: generating a geographic band with a control unit; generating a point of interest ranking based on a point of interest within the geographic band; calculating a point of interest score based on a band score, a diversity score, a popularity score, or a combination thereof; and updating the point of interest ranking based on the point of interest score for presenting on a device.

20 Claims, 7 Drawing Sheets

US 10,317,238 B2

NAVIGATION SYSTEM WITH RANKING MECHANISM AND METHOD OF OPERATION THEREOF

TECHNICAL FIELD

The present invention relates generally to a navigation system, and more particularly to a system with ranking mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without ranking mechanism to identify point of interest relevant to the user has become a paramount concern for the consumer. The inability decreases the benefit of using the tool.

Thus, a need still remains for a navigation system with ranking mechanism to provide point of interest to the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a geographic band with a control unit; generating a point of interest ranking based on a point of interest within the geographic band; calculating a point of interest score based on a band score, a diversity score, a popularity score, or a combination thereof; and updating the point of interest ranking based on the point of interest score for presenting on a device.

The present invention provides a navigation system, including: a control unit for: generating a geographic band, generating a point of interest ranking based on a point of interest within the geographic band, calculating a point of interest score based on a band score, a diversity score, a popularity score, or a combination thereof, updating the point of interest ranking based on the point of interest score, and a communication interface, coupled to the control unit, for communicating the point of interest ranking for presenting on a device.

The present invention provides a navigation system having a non-transitory computer readable medium including instructions for execution, the instructions comprising: generating a geographic band; generating a point of interest ranking based on a point of interest within the geographic band; calculating a point of interest score based on a band score, a diversity score, a popularity score, or a combination thereof; and updating the point of interest ranking based on the point of interest score for presenting on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
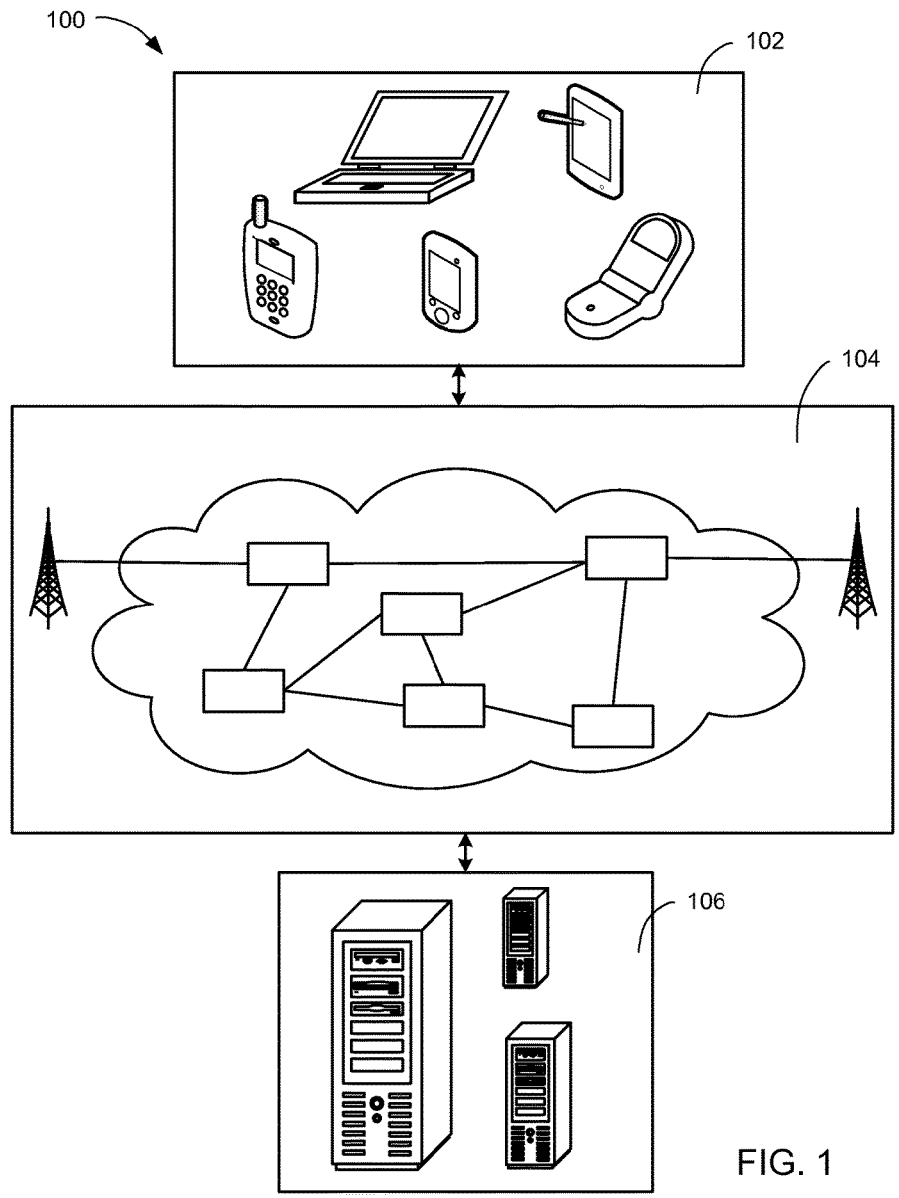
FIG. 1 is a navigation system with ranking mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof Referring now to FIG. 1, therein is shown a navigation system 100 with ranking mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
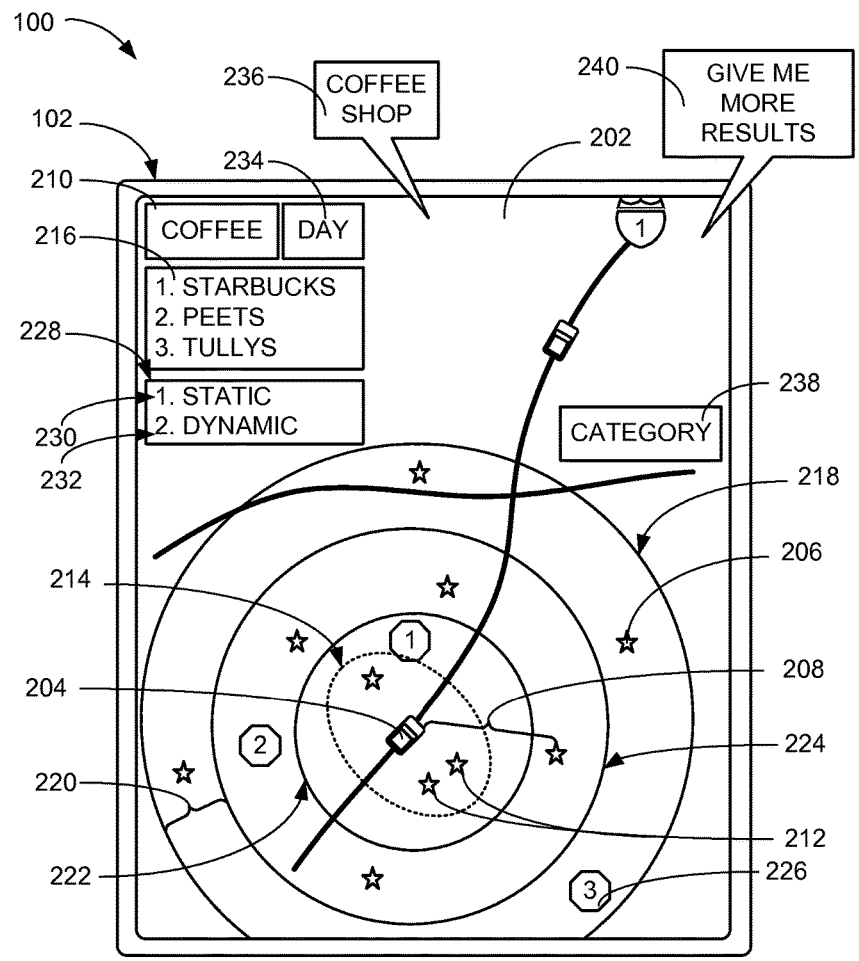
FIG. 2 is an example of a geographic area traveled by the user of the navigation system.

Referring now to FIG. 2, there is shown an example of a geographic area 202 traveled by the user of the navigation system 100. For clarity and brevity, the discussion of the embodiment of the present invention will focus on the first device 102 delivering the result generated by the navigation system 100. However, the second device 106 of FIG. 1 and the first device 102 can be discussed interchangeably.

The geographic area 202 can represent a metropolitan area, a rural area, or a combination thereof. The geographic area 202 can also represent a neighborhood, a city, a county, a state, a country, or a combination thereof. A current location 204 is defined as a position of the first device 102. A point of interest 206 is defined as a candidate geographic location for end of travel. For example, the point of interest 206 can represent a potential target destination interested by the user of the navigation system 100. A distance 208 can represent the physical distance between the point of interest 206 and the current location 204.

A category of interest 210 is a classification of the point of interest 206. For example, the category of interest 210 can represent coffee, shopping mall, theatre, restaurant, or a combination thereof. A point of interest density 212 is defined as a number of instances of the point of interest 206 in a defined physical area. For example, the point of interest density 212 can represent the number of instances of the point of interest 206 within the geographic area 202. A point of interest group 214 is defined as a grouping of the point of interest 206. For example, the point of interest 206 with the category of interest 210 of coffee shop can be grouped in one instance of the point of interest group 214 while the point of interest 206 with the category of interest 210 of shopping mall can be grouped in another instance of the point of interest group 214.

A point of interest ranking 216 is defined as ordering of a plurality of the point of interest 206 based on priority. For example, the point of interest ranking 216 can base on the distance 208. More specifically, the point of interest 206 that is closer to the current location 204 can be ranked higher in the point of interest ranking 216 than the point of interest 206 that is further to the current location 204.

A geographic band 218 is defined as a predefined area for segmenting the geographic area 202. For example, the geographic band 218 can surround the current location 204 or not. The geographic band 218 can have a band dimension 220, which is defined as a physical characteristic of the geographic band 218. For example, the band dimension 220 can represent a torus shape surrounding the current location 204. For another example, the band dimension 220 can represent a polygon, a circle, or a combination thereof.

For further example, a plurality of the geographic band 218 can exist. More specifically, a first geographic band 222 can surround the current location 204. And a second geographic band 224 can surround the first geographic band 222. Both instances of the geographic band 218 can have a torus shape. For a different example, the first geographic band 222 and the second geographic band 224 can be disjointed and not adjacent to each other. Or the two instances of the geographic band 218 can overlap each other.

A band index 226 is defined as a value to order a plurality of the geographic band 218.

For example, the geographic band 218 closest to the current location 204 can have the band index 226 of 0. The geographic band 218 that is next closest to the current location 204 can have the band index 226 of 1.

A band type 228 is defined as categorization of the geographic band 218. For example, band type 228 can include a static band 230, a dynamic band 232, or a combination thereof. The static band 230 is defined as the geographic band 218 with the fixed instance of the band dimension 220. The dynamic band 232 is defined as the geographic band 218 with the non-fixed instance of the band dimension 220. A context 234 is defined as a situation, circumstance, or a combination thereof surrounding the first device 102. For example, the band dimension 220 representing the width of the geographic band 218 can change based on if the context 234 is nighttime or daytime.

A user query 236 is defined as an entry to the first device 102 to seek information related to the point of interest 206. A search type 238 is defined as a classification of the user query 236. A user response 240 is defined as a reaction made to the first device 102 after the point of interest ranking 216 is presented on the first device 102.

Figure 3:
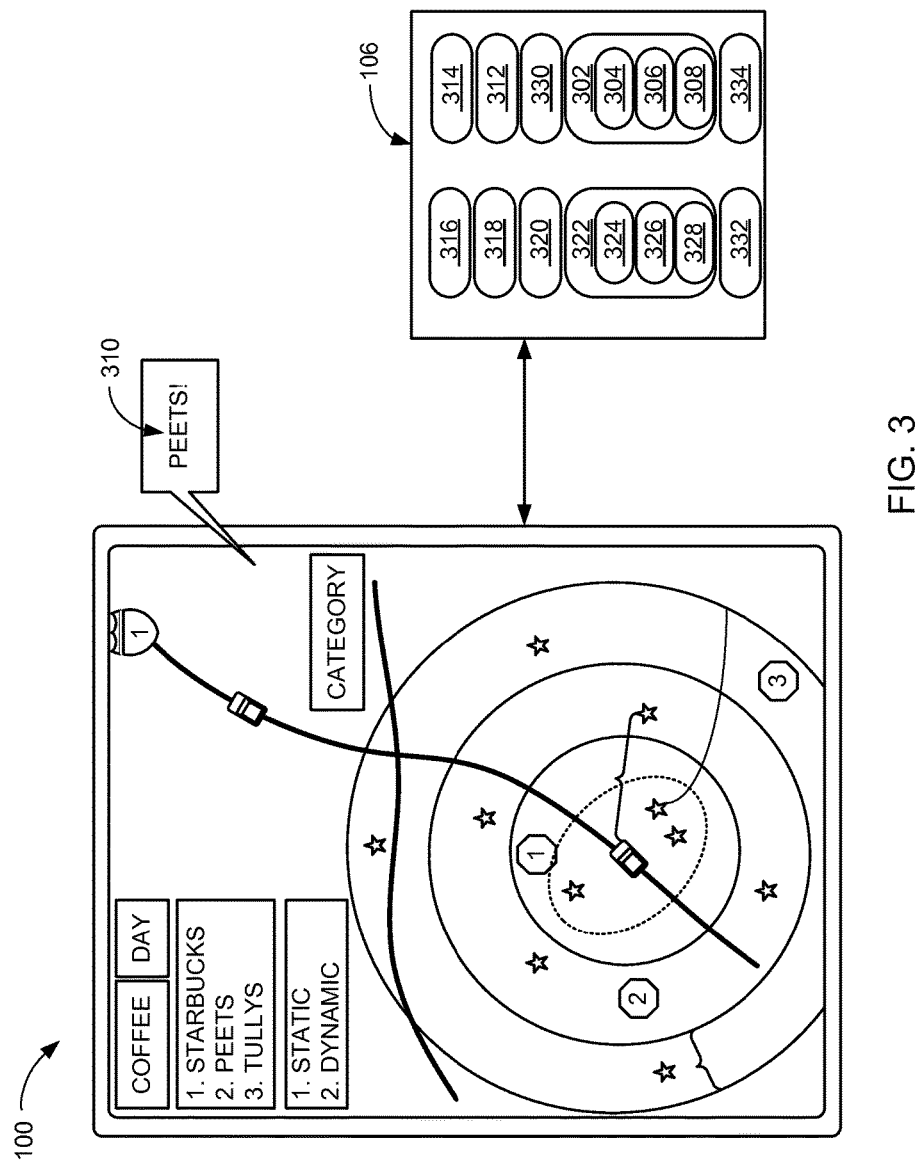
FIG. 3 is an example of architecture of the navigation system.

Referring now to FIG. 3, there is shown an example of architecture of the navigation system 100. The architecture can illustrate the first device 102 and the second device 106 interacting for generating a result for the user. The navigation system 100 can generate the point of interest ranking 216 of FIG. 2 based on a model type 302, which is defined as a classification of model used by the navigation system 100 to determine the point of interest ranking 216. For example, the model type 302 can include a keyword ranking model 304, a band ranking model 306, a default model 308, or a combination thereof The keyword ranking model 304 is defined as a standard to determine the point of interest ranking 216 using a keyword 310. The band ranking model 306 is defined as a standard to determine the point of interest ranking 216 using the category of interest 210 of FIG. 2. The default model 308 is defined as a standard to determine the point of interest ranking 216 without using the keyword 310, the category of interest 210, or a combination thereof An activity history 312 is a log for using the navigation system 100. For example, the activity history 312 can track the following activities: frequency of driving; drive through rate; the distance 208 of FIG. 2 between instances of the point of interest 206 of FIG. 2; normalized driving frequency in local city =(frequency of driving to a given instance of the point of interest 206)/(Max frequency of driving to any instances of the point of interest 206 in local city); click frequency; click through rate =frequency of point of interest 206 clicks/total point of interest 206 impressions; count of point of interest 206; or a combination thereof The navigation system 100 can calculate a point of interest score 314, which is defined as a factor to determine the point of interest ranking 216 of FIG. 2. The point of interest score 314 can be calculated based on a band score 316, a diversity score 318, a popularity score 320, a score weight 322, or a combination thereof. The score weight 322 can include a band weight 324, a diversity weight 326, a popularity weight 328, or a combination thereof The band score 316 is defined as a value given to the point of interest 206 based on the geographic band 218 where the point of interest 206 is located. The band weight 324 is defined as an amount of importance placed on the band score 316. A score interval 330 is a constant value used to calculate the band score 316.

The diversity score 318 is defined as a value based on a redundancy of the point of interest 206 within the geographic band 218. For example, the redundancy can based on the same brand type, the same instances of the category of interest 210, or a combination thereof The diversity weight 326 is defined as an amount of importance placed on the diversity score 318.

The popularity score 320 is defined as a value based on the activity history 312. The popularity weight 328 is defined as an amount of importance placed on the popularity score 320. A popularity threshold 332 is defined as a minimum value of the popularity score 320 required.

A result sufficiency 334 is defined as an acceptable level of the output produced by the navigation system 100. For example, the result sufficiency 334 can represent whether the point of interest ranking 216 generated by the navigation system 100 is acceptable by the user. The user response 240 can indicate whether the result sufficiency 334 was "sufficient" or "insufficient."

Figure 4:
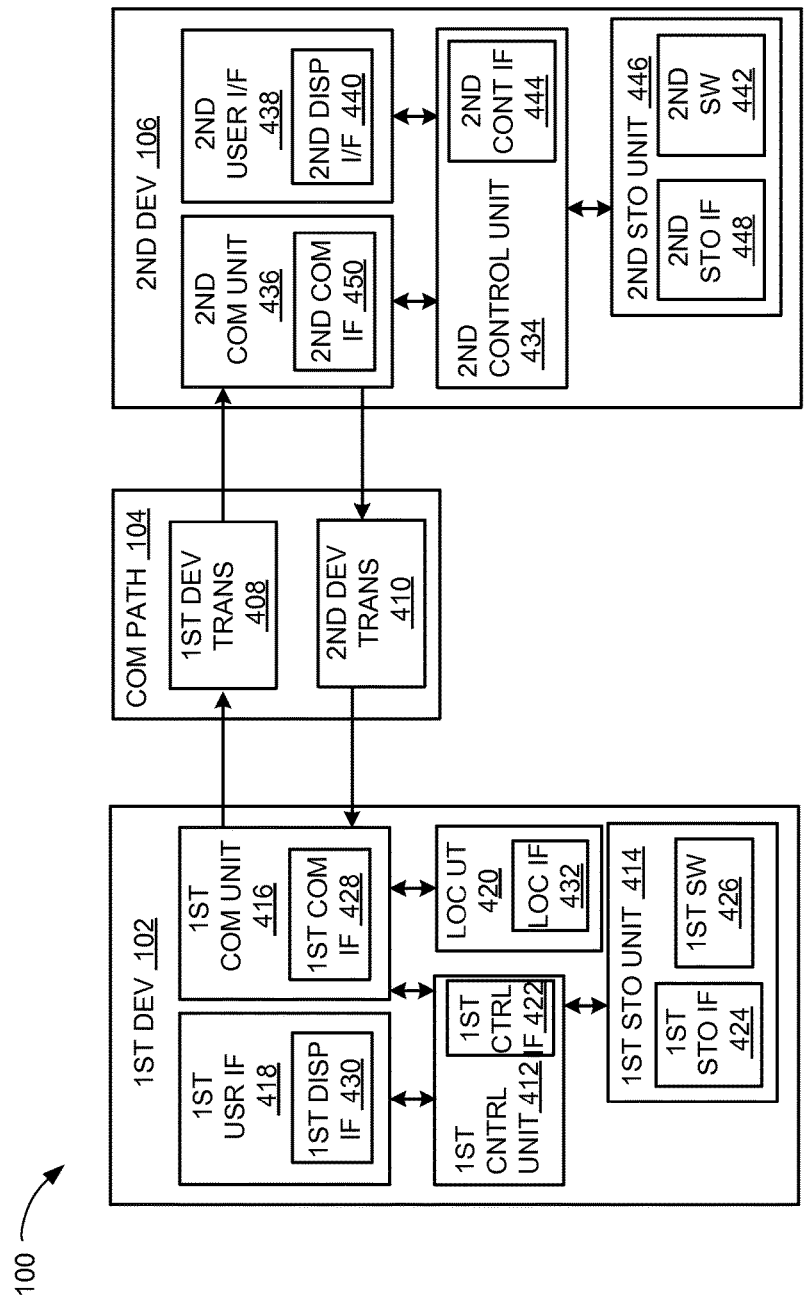
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450.

The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
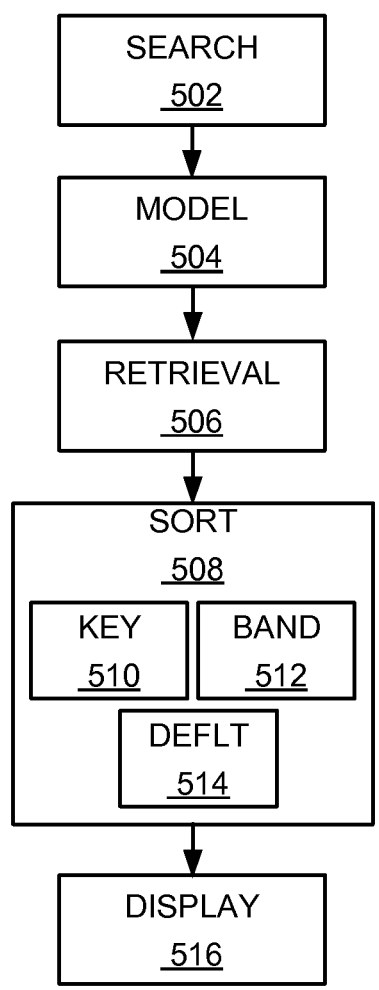
FIG. 5 is a control flow of the navigation system.

Referring now to FIG. 5, therein is shown a control flow of the navigation system 100. The navigation system 100 can include a search module 502. The search module 502 determines the search type 238 of FIG. 2. For example, the search module 502 can determine the search type 238 based on the user query 236 of FIG. 2.

The search module 502 can determine the search type 238 in a number of ways. For example, the search module 502 can determine the search type 238 to represent that the user of the navigation system 100 desires to search for the point of interest 206 of FIG. 2 based on the category of interest 210 of FIG. 2. More specifically, the user query 236 can include a word such as "restaurant," a name of the cuisine type, such as "Italian," or a combination thereof. By deciphering and comparing the word in the user query 236 to the word data stored in the first storage unit 414 of FIG. 4, the search module 502 can determine the search type 238 to be based on the category of interest 210.

For a different example, the search module 502 can determine the search type 238 to represent that the user of the navigation system 100 desires to search for the point of interest 206 based on the keyword 310 of FIG. 3. More specifically, the user query 236 can include the word representing a particular brand, such as Starbucks Coffee (TM). By deciphering and comparing the word in the user query 236 to the word data stored in the first storage unit 414, the search module 502 can determine the search type 238 to be based on the keyword 310. The search module 502 can communicate the search type 238 to a model module 504.

The navigation system 100 can include the model module 504, which can couple to the search module 502. The model module 504 determines the model type 302 of FIG. 3. For example, the model module 504 can determine the model type 302 based on the search type 238.

The model module 504 can determine the model type 302 in a number of ways. For example, the model module 504 can determine the model type 302 to represent the keyword ranking model 304 of FIG. 3 if the search type 238 is based on the keyword 310. For a different example, the model module 504 can determine the model type 302 to represent the band ranking model 306 of FIG. 3 if the search type 238 is based on the category of interest 210. For another example, the model module 504 can determine the model type 302 to represent the default model 308 of FIG. 3 if the search type 238 is based on neither the keyword 310 nor the category of interest 210. The model module 504 can communicate the model type 302 to a sort module 508.

The navigation system 100 can include a retrieval module 506, which can couple to the model module 504. The retrieval module 506 retrieves the point of interest 206. For example, the retrieval module 506 can retrieve the point of interest 206 based on the search type 238.

The retrieval module 506 can retrieve the point of interest 206 in a number of ways. For example, the retrieval module 506 can retrieve the point of interest 206 based on the search type 238 of the keyword 310. More specifically, the point of interest 206 retrieved by the retrieval module 506 can have the keyword 310 as part of the name of the point of interest 206. For a different example, the retrieval module 506 can retrieve the point of interest 206 based on the search type 238 of the category of interest 210. More specifically, the point of interest 206 retrieved by the retrieval module 506 can represent the point of interest 206 categorized under the category of interest 210.

For further example, the point of interest 206 can be stored within the first storage unit 414, the external sources, or a combination thereof which the retrieval module 506 can communicate to retrieve the point of interest 206. Further, the retrieval module 506 can retrieve a plurality of the point of interest 206 based on the search type 238 to provide a number of instances of the point of interest 206 that the user may be interested. The retrieval module 506 can communicate the point of interest 206 to the sort module 508.

The navigation system 100 can include the sort module 508, which can couple to the retrieval module 506, the model module 504, or a combination thereof. The sort module 508 generates the point of interest ranking 216 of FIG. 2. For example, the sort module 508 can generate the point of interest ranking 216 based on the model type 302, the point of interest 206, or a combination thereof.

The sort module 508 can generate the point of interest ranking 216 in a number of ways. The sort module 508 can include a keyword module 510. The keyword module 510 generates the point of interest ranking 216 based on the keyword ranking model 304. More specifically, if the point of interest 206 was retrieved based on the search type 238 of the keyword 310, the point of interest can include the keyword 310. As a result, the keyword module 510 can generate the point of interest ranking 216 of the point of interest 206 with the keyword 310.

For a specific example, the keyword module 510 can generate the point of interest ranking 216 based on the distance 208 of FIG. 2 from the current location 204 of FIG. 2. More specifically, the keyword module 510 can order the point of interest 206 based on closest to the farthest or furthest to closest of the distance 208 between the point of interest 206 having the keyword 310 and the current location 204. The keyword module 510 can generate the point of interest ranking 216 based on the point of interest 206 ordered.

The sort module 508 can include a band module 512. The band module 512 generates the point of interest ranking 216 based on the band ranking model 306. More specifically, if the point of interest 206 was retrieved based on the search type 238 of the category of interest 210, the point of interest 206 can be categorized under the category of interest 210. As a result, the band module 512 can generate the point of interest ranking 216 having the point of interest 206 for the category of interest 210. Details regarding the band module 512 generating the point of interest ranking 216 will be discussed below.

The sort module 508 can include a default module 514. The default module 514 generates the point of interest 206 based on the default model 308. For example, the point of interest 206 can be retrieved based on neither the search type 238 of the category of interest 210 nor the keyword 310. The default module 514 can generate point of interest ranking 216 based on the distance 208 between the point of interest 206 and the current location 204. More specifically, the default module 514 can generate the point of interest ranking 216 based on the distance 208 of closest to furthest or furthest to closest between the point of interest 206 and the current location 204. The sort module 508 can communicate the point of interest ranking 216 to a display module 516.

The navigation system 100 can include the display module 516, which can couple to the sort module 508. The display module 516 displays the point of interest ranking 216. For example, the display module 516 can display the point of interest ranking 216 on the first display interface 430 of FIG. 4 of the first device 102.

The display module 516 can determine the result sufficiency 334 of FIG. 3 based on the user response 240 of FIG. 2. As discussed above, the point of interest ranking 216 can be displayed on the first device 102 for the user to view. The user can perform the user response 240 to select the point of interest 206 listed on the point of interest ranking 216. Based on the user response 240 of selection, the display module 516 can determine the result sufficiency 334 of "sufficient" to indicate that the navigation system 100 has provided information related to the point of interest 206 interested by the user.

In contrast, the user response 240 can be no response or continual scrolling of the list of the point of interest 206 presented as the point of interest ranking 216 without selecting a particular instance of the point of interest 206.

Based on the user response 240, the display module 516 can determine the result sufficiency 334 to be "insufficiency." The display module 516 can communicate the result sufficiency 334 to the sort module 508 to command the sort module 508 to increment the band index 226 of FIG. 2 to provide point of interest 206 from the geographic band 218 of FIG. 2 with the subsequent instance of the band index 226. Details regarding the band index 226, the geographic band 218, or a combination thereof will be discussed below.

The physical transformation from changing the current location 204 to reach the point of interest 206 results in the movement in the physical world, such as people using the first device 102, the vehicle, or a combination thereof, based on the operation of the navigation system 100. As the movement in the physical world occurs, the movement itself creates additional information that is converted back into retrieving the point of interest 206, generating the point of interest ranking 216, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the search module 502, the model module 504, the retrieval module 506, the sort module 508, and the display module 516.

The first control unit 412 of FIG. 4 can execute the first software 426 for the search module 502 to determine the search type 238. The first control unit 412 can execute the first software 426 for the model module 504 to determine the model type 302. The first control unit 412 can execute the first software 426 for the retrieval module 506 to retrieve the point of interest 206. The first control unit 412 can execute the first software 426 for the sort module 508 to generate the point of interest ranking 216. Furthermore, the first control unit 412 can execute the first software 426 to operate the modules within the sort module 508. The first control unit 412 can execute the first software 426 for the display module 516 to display the point of interest ranking 216.

The second software 442 of FIG. 4 of the second device 106 of FIG. 4 can include the modules for the navigation system 100. For example, the second software 442 can include the search module 502, the model module 504, the retrieval module 506, the sort module 508, and the display module 516.

The second control unit 434 of FIG. 4 can execute the second software 442 for the search module 502 to determine the search type 238. The second control unit 434 can execute the second software 442 for the model module 504 to determine the model type 302. The second control unit 434 can execute the second software 442 for the retrieval module 506 to retrieve the point of interest 206. The second control unit 434 can execute the second software 442 for the sort module 508 to generate the point of interest ranking 216. Furthermore, the second control unit 434 can execute the second software 442 to operate the modules within the sort module 508. The second control unit 434 can execute the second software 442 for the display module 516 to display the point of interest ranking 216.

The modules of the navigation system 100 can be partitioned between the first software 426 and the second software 442. The second software 442 can include search module 502, the model module 504, the retrieval module 506, and the sort module 508. The second control unit 434 can execute modules partitioned on the second software 442 as previously described.

The first software 426 can include the display module 516. Based on the size of the first storage unit 414, the first software 426 can include additional modules of the navigation system 100. The first control unit 412 can execute the modules partitioned on the first software 426 as previously described.

The first control unit 412 can operate the first communication interface 428 of FIG. 4 to communicate the current location 204, the user query 236, the point of interest 206, the point of interest ranking 216, or a combination thereof to or from the second device 106. The first control unit 412 can operate the first software 426 to operate the location unit 420 of FIG. 4. The second control unit 434 can operate the second communication interface 450 of FIG. 4 to communicate the current location 204, the user query 236, the point of interest 206, the point of interest ranking 216, or a combination thereof to or from the first device 102 through the communication path 104 of FIG. 4.

The first control unit 412 can operate the first user interface 418 of FIG. 4 for the display module 516 to present the point of interest ranking 216. The second control unit 434 can operate the second user interface 438 of FIG. 4 for the display module 516 to present the point of interest ranking 216.

The navigation system 100 describes the module functions or order as an example. The modules can be partitioned differently. For example, the search module 502 and the model module 504 can be combined. For another example, the key module 510 and the band module 512 can be combined. As a result, sort module 508 can apply the band ranking model 306 to the search type 238 based on the keyword 310 and apply the keyword ranking model 304 based on the category of interest 210. Each of the modules can operate individually and independently of the other modules. Furthermore, data generated in one module can be used by another module without being directly coupled to each other. For example, the sort module 508 can receive the model type 302 from the model module 504. Further, one module communicating to another module can represent one module sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. Furthermore, the first control unit 412, the second control unit 434, or a combination thereof can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figures 6, 7:
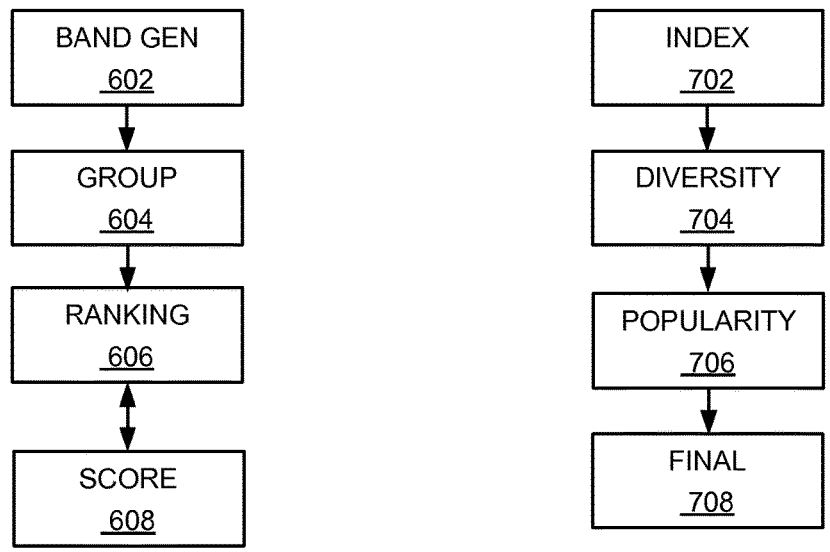
FIG. 6 is a control flow of the band module.
FIG. 7 is a control flow of the score module.

Referring now to FIG. 6, therein is shown a control flow of the band module 512. The band module 512 can include a band generator module 602. The band generator module 602 generates the geographic band 218 of FIG. 2. For example, the band generator module 602 can generate the geographic band 218 based on the category of interest 210 of FIG. 2, the point of interest density 212 of FIG. 2, the distance 208 of FIG. 2, the band type 228 of FIG. 2, the activity history 312 of FIG. 3, or a combination thereof.

The band generator module 602 can generate the geographic band 218 in a number of ways. For example, the band generator module 602 can generate the geographic band 218 based on the distance 208 from the current location 204 of FIG. 2. More specifically, the band generator module 602 can generate a plurality of the geographic band 218 having the band dimension 220 of FIG. 2 of torus shape surrounding the current location 204. For example, the band generator module 602 can generate the first geographic band 222 of FIG. 2 with the furthest extent of the first geographic band 222 with the distance 208 of 1 kilometer from the current location 204. Furthermore, the band generator module 602 can generate the second geographic band 224 of FIG. 2 surrounding the first geographic band 222 and the current location 204. The distance 208 from the furthest extent of the first geographic band 222 to the furthest extent of the second geographic band 224 can be, as an example, 2 kilometers. The band generator module 602 can generate additional instances of the geographic band 218 subsequent to the second geographic band 224 to cover the geographic area 202 of FIG. 2.

The band generator module 602 can change the band dimension 220 of the geographic band 218 based on the activity history 312, the category of interest 210, or a combination thereof. For example, the activity history 312 can indicate that for the category of interest 210 of coffee, as an example, close to 75 percent of all users of the navigation system 100 travels to the coffee shop within the distance 208 of 3 kilometers from the current location 204. As a result, the band generator module 602 can generate the geographic band 218 with the band dimension 220 of 1 kilometer of width for the first three instances of the geographic band 218 from the current location 204 but increase the band dimension 220 to 3 kilometers of width for the subsequent instances of geographic band 218.

For a different example, the activity history 230 can indicate that for the category of interest 210 of shopping mall, as an example, over 50% of all users of the navigation system 100 travels to the shopping mall with the distance 208 greater than 3 kilometers from the current location 204. As a result, the band generator module 602 can generate the geographic band 218 with the band dimension 220 of 5 kilometer of width for each instances of the geographic band 218.

For another example, the band generator module 602 can change the band dimension 220 based on the category of interest 210, the point of interest density 212, the geographic area 202, or a combination thereof. The geographic area 202 can represent a metropolitan area. The category of interest 210 can represent coffee. The point of interest density 212 can represent 20 coffee shops within 1 square kilometer within the metropolitan area. As a result, the band generator module 602 can generate the geographic band 218 with the band dimension 220 of 0.1 kilometer of width increment to cover the geographic area 202.

For another example, the band generator module 602 can generate the geographic band 218 with a variety of the band type 228 based on the activity history 312, the category of interest 210, or a combination thereof. More specifically, the band generator module 602 can generate the geographic band 218 with the band type 228 of the static band 230 of FIG. 2. For example, the band generator module 602 can generate the static band 230 based on the category of interest 210 having the band dimension 220 of the static band 230 being fixed.

In contrast, the band generator module 602 can generate the geographic band 218 with the band type 228 of the dynamic band 232 of FIG. 2. More specifically, the band generator module 602 can generate the dynamic band 232 based on the category of interest 210, the activity history 312, the geographic area 202, the context 234 of FIG. 2, or a combination thereof. For example, the category of interest 210 can represent coffee. The context 234 can represent daytime. As discussed above, the band generator module 602 can generate a plurality of the geographic band 218.

When the context 234 changes from daytime to nighttime, a number of coffee shops opened can change. As a result, the activity history 312 can indicate that the user is willing to drive further away from the current location 204 to find a coffee shop that is open. The band generator module 602 can generate the dynamic band 232 to change the band dimension 220 based on the context 234 to cover optimal area of the geographic area 202 to include the point of interest 206 of FIG. 2.

For further example, the band generator module 602 can determine the band index 226 of FIG. 2. More specifically, the band generator module 602 can determine the band index 226 based on the geographic band 218, the distance 208 from the current location 204, or a combination thereof. As discussed above, the band generator module 602 can generate the first geographic band 222, the second geographic band 224, so on and so forth. The band generator module 602 can determine the band index 226 for each instances of the geographic band 218 according to the distance 208 of each instances of geographic band 218 from the current location 204. For example, the band generator module 602 can determine the band index 226 starting from 0 and increment by 1. More specifically, the band generator module 602 can determine the band index 226 for the first geographic band 222 to be 0, the second geographic band 224 to be 1, and the subsequent instance of the geographic band 218 to be 2, and so on and so forth. The band generator module 602 can communicate the geographic band 218, the band dimension 220, the band index 226, or a combination thereof to a group module 604.

It has been discovered that the navigation system 100 generating the geographic band 218 based on the category of interest 210, the context 234, or a combination thereof can improve the accuracy of providing the point of interest 206. More specifically, by generating the geographic band 218 optimal for the category of interest 210, the context 234, or a combination thereof, the navigation system 100 can cover the geographic area 202 efficiently to include the point of interest 206 interested by the user. As a result, the navigation system 100 can improve the delivery of the point of interest 206 for safer operation of the navigation system 100, the vehicle, or a combination thereof.

The band module 512 can include the group module 604, which can couple to the band generator module 602. The group module 604 generates the point of interest group 214 of FIG. 2. For example, the group module 604 can generate the point of interest group 214 based on the point of interest 206, the geographic band 218, or a combination thereof. More specifically, the group module 604 can generate the point of interest group 214 by organizing a plurality of the point of interest 206 according to the geographic band 218 of each instances of the point of interest 206 are located. The point of interest 206 in the first geographic band 222 can be grouped within the point of interest group 214 of the first geographic band 222. The point of interest 206 in the second geographic band 224 can be grouped within the point of interest group 214 of the second geographic band 224 and so on and so forth. The group module 604 can communicate the point of interest group 214 to a ranking module 606.

The band module 512 can include the ranking module 606, which can couple to the group module 604. The ranking module 606 generates the point of interest ranking 216. For example, the ranking module 606 can generate the point of interest ranking 216 based on the distance 208, the point of interest group 214, or a combination thereof. More specifically, the ranking module 606 can generate the point of interest ranking 216 by ordering the plurality of the point of interest 206 within the point of interest group 214 according to the distance 208 from the current location 204. For example, the ranking module 606 can generate the point of interest ranking 216 based on the order of closest to furthest or furthest to closest of the distance 208 between the current location 204 and point of interest 206. The ranking module 606 can communicate the point of interest ranking 216 to a score module 608.

The band module 512 can include the score module 608, which can couple to the ranking module 606. The score module 608 calculates the point of interest score 314 of FIG. 3. For example, the score module 608 can calculate the point of interest score 314 based on the band score 316 of FIG. 3, the diversity score 318 of FIG. 3, the popularity score 320 of FIG. 3, or a combination thereof. Details regarding the score module 608 generating the point of interest score 314 will be discussed below. The score module 608 can communicate the point of interest score 314 the ranking module 606

For illustrative purposes, the navigation system 100 is described with the ranking module 606 generating the point of interest ranking 216, although it is understood that the ranking module 606 can operate differently. For example, the ranking module 606 can update the point of interest ranking 216 based on the point of interest score 314. As it will be discussed below, the point of interest score 314 can change the order of the point of interest ranking 216 by providing additional data point to determine the ordering of the point of interest 206 within the point of interest group 214. The ranking module 606 can update the point of interest ranking 216 by resorting the point of interest ranking 216 according to the point of interest score 314 calculated. The ranking module 606 can communicate the point of interest ranking 216 updated to the display module 516 of FIG. 5.

It has been discovered that the navigation system 100 updating the point of interest ranking 216 based on the point of interest score 314 improves the accuracy of the point of interest 206 interested by the user. By resorting the point of interest ranking 216 based on the point of interest score 314, the navigation system 100 can tailor the point of interest ranking 216 to the user's behavior and interest. As a result, the navigation system 100 can improve the accuracy of delivering the information interested by the user for the safer operation of the navigation system 100, the vehicle, or a combination thereof.

Referring now to FIG. 7, therein is shown a control flow of the score module 608. As discussed above, the score module 608 can calculate the point of interest score 314 of FIG. 3 for each instances of the point of interest 206 of FIG. 2. More specifically, the score module 608 can calculate the point of interest score 314 based on the band score 316 of FIG. 3, the diversity score 318 of FIG. 3, the popularity score 320 of FIG. 3, or a combination thereof. As an example, the lower the value of the point of interest score 314, the higher importance that the point of interest 206 will be to the user of the navigation system 100 of FIG. 1.

The score module 608 can include an index module 702. The index module 702 calculates the band score 316. For example, the index module 702 can calculate the band score 316 with the following formula:

band score 316=band index 226*score interval 330

The band index 226 of FIG. 2 can increment by 1 as discussed above. The score interval 330 of FIG. 3 can represent a constant number of 10. For example, the index module 702 can calculate the band score 316 for the point of interest 206 of FIG. 2 located within the first geographic band 222 of FIG. 2. The band index 226 can represent 0 and the score interval 330 can represent 10. As a result, the band score 316 can represent 0 for the point of interest 206 within the first geographic band 222.

The index module 702 can calculate the band score 316 for the point of interest 206 located within the second geographic band 224 of FIG. 2. The band index 226 can represent 1 and the score interval 330 can represent 10. As a result, the band score 316 can represent 10 for the point of interest 206 within the second geographic band 224. The index module 702 can calculate the band score 316 for each instances of the point of interest 206 within each instances of the geographic band 218 of FIG. 2. The index module 702 can communicate the band score 316 to a diversity module 704.

It has been discovered that the navigation system 100 calculating the band score 316 improves the accuracy of providing the point of interest 206 most interested by the user. By calculating the band score 316, the point of interest 206 that is closer thus interested will be ranked higher than the point of interest 206 that is further thus less interested. As a result, the navigation system 100 can improve the efficiency and accuracy of delivering the point of interest 206 for safer operation of the navigation system 100, the vehicle, or a combination thereof.

The score module 608 can include the diversity module 704, which can couple to the index module 702. The diversity module 704 calculates the diversity score 318. For example, the diversity module 704 can calculate the diversity score 318 based on the point of interest 206, the point of interest density 212 of FIG. 2, the point of interest ranking 216 of FIG. 2, the geographic band 218, or a combination thereof For a specific example, a plurality of the point of interest 206 with the same brand type can exist within a particular instance of the geographic band 218. More specifically, the brand type can represent Starbucks Coffee™. The point of interest 206 can represent the Starbucks Coffee™ shop. As discussed above, the point of interest ranking 216 can order a plurality of the point of interest 206 based on the distance 208 of FIG. 2 between the point of interest 206 and the current location 204 of FIG. 2. For example, the closest instance of the point of interest 206 can receive the diversity score 318 of 0 and other instances of the point of interest 206 can be penalized by 1 based on the distance 208. More specifically, the second closest instance of the point of interest 206 can receive the diversity score 318 of 1 or penalty of 1 and the third closest instance of the point of interest 206 can receive the diversity score 318 of 2 or penalty of 2. The penalty can increment by 1 as long as the point of interest 206 share the same brand type and the geographic band 218 with another point of interest 206 that is closer to the current location 204. The diversity module 704 can communicate the diversity score 318 to a popularity module 706.

It has been discovered that the navigation system 100 calculating the diversity score 318 improves the accuracy of providing the point of interest 206 most interested by the user. By calculating the diversity score 318, the point of interest 206 that is closer thus interested will be ranked higher than the point of interest 206 that is further thus less interested. As a result, the navigation system 100 can improve the efficiency and accuracy of delivering the point of interest 206 for safer operation of the navigation system 100, the vehicle, or a combination thereof.

The score module 608 can include the popularity module 706, which can couple to the diversity module 704. The popularity module 706 calculates the popularity score 320. For example, the popularity module 706 can calculate the popularity score 320 based on the brand type, the category of interest 210 of FIG. 2, the activity history 312 of FIG. 3, the geographic area 202 of FIG. 2, or a combination thereof.

The popularity module 706 can calculate the popularity score 320 in a number of ways. For example, the popularity score 320 can be quantized into three levels: 0 for very popular, 1 for popular, and 2 for not popular. The popularity module 706 can calculate the popularity score 320 based on the activity history 312 meeting or exceeding the popularity threshold 332 of FIG. 3.

For a specific example, the popularity threshold 332 can represent a minimum number of frequency visiting the point of interest 206. The popularity threshold 332 can represent once a week. If the activity history 312 indicates that the user visits a particular instance of the point of interest 206 greater than the popularity threshold 332, the popularity module 706 can calculate the popularity score 320 of 0. If the activity history 312 indicates that the user visits a particular instance of the point of interest 206 equaling the popularity threshold 332, the popularity module 706 can calculate the popularity score 320 of 1. If the activity history 312 indicates that the user visits a particular instance of the point of interest 206 less than the popularity threshold 332, the popularity module 706 can calculate the popularity score 320 of 2. The popularity module 706 can communicate the popularity score 320 to a final module 708.

It has been discovered that the navigation system 100 calculating the popularity score 320 improves the accuracy of providing the point of interest 206 most interested by the user. By calculating the popularity score 320, the point of interest 206 that is closer thus interested will be ranked higher than the point of interest 206 that is further thus less interested. As a result, the navigation system 100 can improve the efficiency and accuracy of delivering the point of interest 206 for safer operation of the navigation system 100, the vehicle, or a combination thereof.

The score module 608 can include the final module 708, which can couple to the popularity module 706. The final module 708 calculates the point of interest score 314. For example, the final module 708 can calculate the point of interest score 314 based on the band score 316, the diversity score 318, the popularity score 320, the score weight 322 of FIG. 3, or a combination thereof. More specifically, the score weight 322 can include the band weight 324 of FIG. 3, the diversity weight 326 of FIG. 3, the popularity weight 328 of FIG. 3, or a combination thereof.

The final module 708 can calculate the point of interest score 314 with the following formula:

point of interest score 314=band weight 324*band score 316+popularity weight 328*popularity score 320+diversity weight 326*diversity score 318

The band weight 324, the popularity weight 328, the diversity weight 326, or a combination thereof can be set to 1. However, the value of each instances of the score weight 322 can be changed to fine tune the calculation of the point of interest score 314. For further example, the point of interest score 314 in the lower instance of the band index 226 will be lower than the point of interest score 314 in the higher instance of the band index 226. The final module 708 can communicate the point of interest score 314 to the ranking module 606 of FIG. 6.

Figure 8:
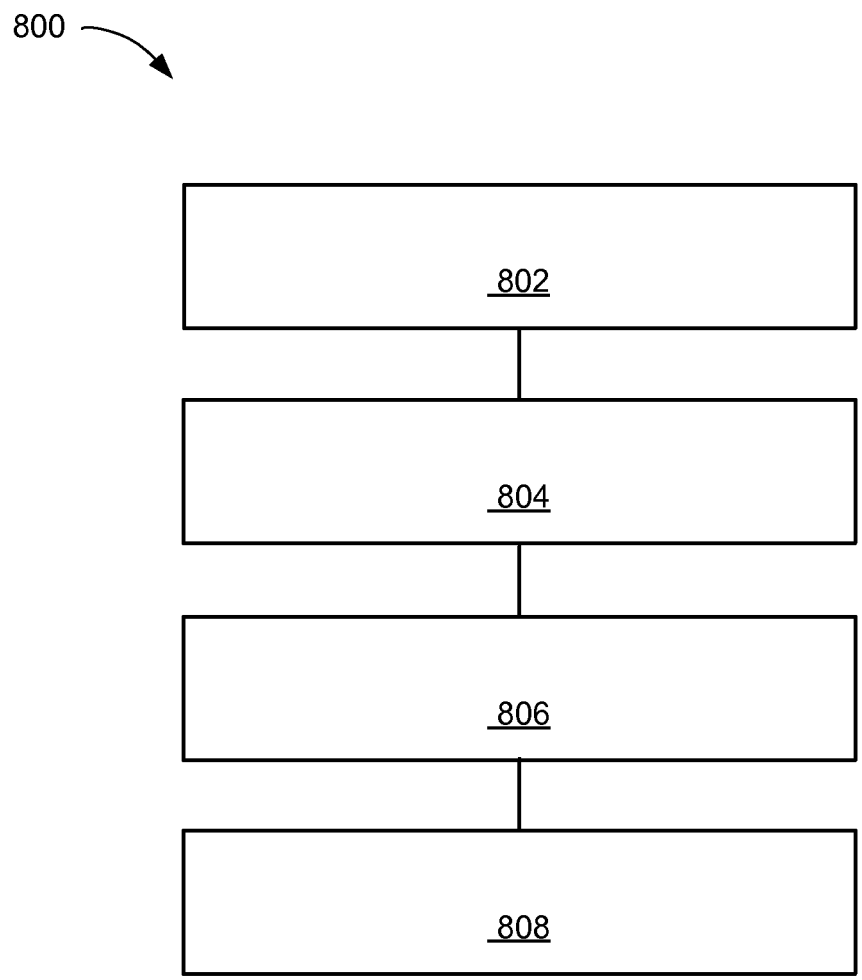
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: generating a geographic band with a control unit in a block 802; generating a point of interest ranking based on a point of interest within the geographic band in a block 804; calculating a point of interest score based on a band score, a diversity score, a popularity score, or a combination thereof in a block 806; and updating the point of interest ranking based on the point of interest score for presenting on a device in a block 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating multiple instances of a geographic band including a dynamic band with a control unit for changing a band dimension dynamically and in real-time according to a context and a category of interest for updating a point of interest density within the geographic band;
determining a band index for each instances of the geographic band based on a distance of the geographic band from a current location;
calculating a diversity score based on multiple instances of a point of interest, within the geographic band, having a same instance of the category of interest, wherein the point of interest at the distance closer to the current location scoring higher than the point of interest further away from the current location;
generating a point of interest ranking based on multiple instances of the point of interest within the geographic band including the band index;
calculating a point of interest score based on a band score with a band weight, the diversity score with a diversity weight, a popularity score with a popularity weight, or a combination thereof wherein the band weight, the diversity weight, and the popularity weight are independent from one another;
updating the point of interest ranking based on the point of interest score to improve an accuracy of delivering the point of interest relevant to a user's interest; and
displaying a change in the band dimension for each of the dynamic band for including the point of interest ranking relevant to the updated instance of the context and the point of interest density for presenting on a device.

2. The method as claimed in claim 1 wherein generating the geographic band includes changing the band dimension of the geographic band based on an activity history, the category of interest, or a combination thereof.

3. The method as claimed in claim 1 further comprising generating a point of interest group based on grouping a plurality of the point of interest within the geographic band.

4. The method as claimed in claim 1 further comprising determining a result sufficiency based on a user response to the point of interest ranking presented.

5. The method as claimed in claim 1 wherein generating the point of interest ranking includes generating the point of interest ranking based on a search type of a user query.

6. The method as claimed in claim 1 wherein generating the point of interest ranking includes generating the point of interest ranking based on ordering a plurality of the point of interest within a point of interest group according to the distance from the current location.

7. The method as claimed in claim 1 wherein calculating the point of interest score includes calculating the point of interest score based on a score weight factored to the band score, the diversity score, the popularity score, or a combination thereof.

8. The method as claimed in claim 1 wherein calculating the point of interest score includes calculating the band score for the point of interest located within the geographic band.

9. The method as claimed in claim 1 wherein calculating the point of interest score includes calculating the diversity score based on a plurality of the point of interest located within the geographic band.

10. The method as claimed in claim 1 wherein calculating the point of interest score includes calculating the popularity score based on an activity history meeting or exceeding a popularity threshold.

11. A navigation system comprising:
a control unit for:
generating multiple instances of a geographic band including a dynamic band for changing a band dimension dynamically and in real-time according to a context and a category of interest for updating a point of interest density within the geographic band,
determining a band index for each instances of the geographic band based on a distance of the geographic band from a current location,
calculating a diversity score based on multiple instances of a point of interest, within the geographic band, having a same instance of the category of interest, wherein the point of interest at the distance closer to the current location scoring higher than the point of interest further away from the current location, generating a point of interest ranking based on multiple instances of the point of interest within the geographic band, calculating a point of interest score based on a band score with a band weight, the diversity score with a diversity weight, a popularity score with a popularity weight, or a combination thereof wherein the band weight, the diversity weight, and the popularity weight are independent from one another, updating the point of interest ranking based on the point of interest score to improve an accuracy of delivery the point of interest relevant to a user's interest, and a display interface, coupled to the control unit, for displaying a change in the band dimension for each of the dynamic band for including the point of interest ranking relevant to the updated instance of the context and the point of interest density for presenting on a device.

12. The system as claimed in claim 11 wherein the control unit is for changing the band dimension of the geographic band based on an activity history, the category of interest, or a combination thereof.

13. The system as claimed in claim 11 wherein the control unit is for generating a point of interest group based on grouping a plurality of the point of interest within the geographic band.

14. The system as claimed in claim 11 wherein the control unit is for determining a result sufficiency based on a user response to the point of interest ranking presented.

15. The system as claimed in claim 11 wherein the control unit is for generating the point of interest ranking based on a search type of a user query.

16. A non-transitory computer readable medium including instructions for execution, the instructions comprising:

generating multiple instances of a geographic band including a dynamic band for changing a band dimension dynamically and in real-time according to a context and a category of interest for updating a point of interest density within the geographic band;

determining a band index for each instances of the geographic band based on a distance of the geographic band from a current location;

calculating a diversity score based on multiple instances of a point of interest, within the geographic band, having a same instance of the category of interest, wherein the point of interest at the distance closer to the current location scoring higher than the point of interest further away from the current location;

generating a point of interest ranking based on multiple instances of the point of interest within the geographic band including the band index;

calculating a point of interest score based on a band score with a band weight, the diversity score with a diversity weight, a popularity score with a popularity weight, or a combination thereof wherein the band weight, the diversity weight, and the popularity weight are independent from one another;

updating the point of interest ranking based on the point of interest score to improve an accuracy of delivering the point of interest relevant to a user's interest; and displaying a change in the band dimension for each of the dynamic band for including the point of interest ranking relevant to the updated instance of the context and the point of interest density for presenting on a device.

17. The non-transitory computer readable medium as claimed in claim 16 wherein changing the band dimension of the geographic band based on an activity history, the category of interest, or a combination thereof.

18. The non-transitory computer readable medium as claimed in claim 16 wherein generating a point of interest group based on grouping a plurality of the point of interest within the geographic band.

19. The non-transitory computer readable medium as claimed in claim 16 wherein determining a result sufficiency based on a user response to the point of interest ranking presented.

20. The non-transitory computer readable medium as claimed in claim 16 wherein generating the point of interest ranking based on a search type of a user query.

* * * * *